United States Patent
Mehra

(10) Patent No.: US 7,995,497 B2
(45) Date of Patent: Aug. 9, 2011

(54) SPONTANEOUS TOPOLOGY DISCOVERY IN A MULTI-NODE COMPUTER SYSTEM

(75) Inventor: Pankaj Mehra, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1323 days.

(21) Appl. No.: 10/375,459

(22) Filed: Feb. 27, 2003

(65) Prior Publication Data
US 2004/0170130 A1 Sep. 2, 2004

(51) Int. Cl.
*H04L 12/28* (2006.01)
*G06F 15/177* (2006.01)
*G06F 15/16* (2006.01)

(52) U.S. Cl. .......................... 370/254; 709/220; 709/252
(58) Field of Classification Search .................. None
See application file for complete search history.

(56) References Cited

U.S. PATENT DOCUMENTS

| | | | |
|---|---|---|---|
| 5,606,669 A * | 2/1997 | Bertin et al. ................. | 709/223 |
| 5,732,086 A * | 3/1998 | Liang et al. .................. | 370/410 |
| 6,134,599 A * | 10/2000 | Chiu et al. ................... | 709/252 |
| 6,219,739 B1 * | 4/2001 | Dutt et al. .................... | 710/311 |
| 6,721,275 B1 * | 4/2004 | Rodeheffer et al. .......... | 370/238 |
| 6,801,506 B1 * | 10/2004 | Dey .............................. | 370/256 |
| 7,010,622 B1 * | 3/2006 | Bauer et al. ................... | 709/252 |
| 7,050,432 B1 * | 5/2006 | Banavar et al. ............... | 370/390 |
| 7,171,476 B2 * | 1/2007 | Maeda et al. ................ | 709/227 |
| 7,376,743 B1 * | 5/2008 | Bazzinotti et al. ........... | 709/229 |
| 2001/0021177 A1 * | 9/2001 | Ishii ............................. | 370/256 |
| 2003/0037167 A1 * | 2/2003 | Garcia-Luna-Aceves et al. ............................ | 709/238 |
| 2003/0095504 A1 * | 5/2003 | Ogier ............................ | 370/235 |
| 2003/0097468 A1 * | 5/2003 | Hamadi ........................ | 709/238 |
| 2003/0161275 A1 * | 8/2003 | Malhotra et al. ............. | 370/256 |
| 2003/0235157 A1 * | 12/2003 | Boivie et al. ................. | 370/254 |
| 2003/0235158 A1 * | 12/2003 | Lee et al. ..................... | 370/256 |
| 2004/0003111 A1 * | 1/2004 | Maeda et al. ................ | 709/237 |
| 2004/0057411 A1 * | 3/2004 | Straub et al. ................. | 370/338 |
| 2004/0062209 A1 * | 4/2004 | Goldman et al. ............. | 370/256 |
| 2004/0073933 A1 * | 4/2004 | Gollnick et al. .............. | 725/81 |
| 2008/0069099 A1 * | 3/2008 | Tani et al. .................... | 370/390 |

\* cited by examiner

*Primary Examiner* — Ricky Ngo
*Assistant Examiner* — Clemence Han

(57) ABSTRACT

A method and associated apparatus may implement spontaneous topology discovery in a computer network. The network may include a plurality of entities. When a change in the topology is detected, a spanning tree is created and topology information is propagated from individual entities through the spanning tree towards an entity that functions as a "root." Arbitrarily large topologies may be discovered this way without requiring arbitrarily large amounts of memory in participating switches.

13 Claims, 3 Drawing Sheets

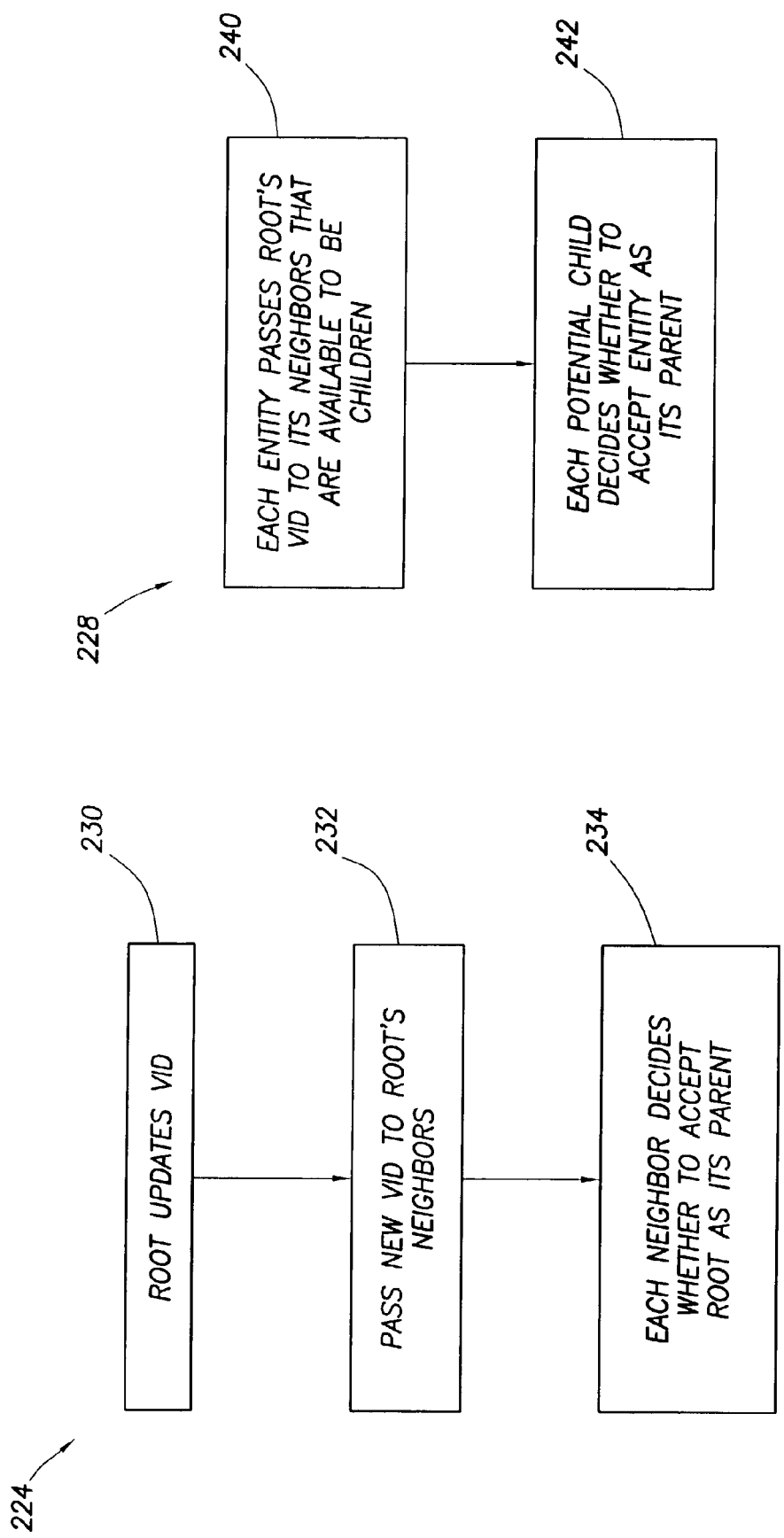

SPONTANEOUS TOPOLOGY DISCOVERY IN A MULTI-NODE COMPUTER SYSTEM

BACKGROUND

Background Information

Some computer networks may be configured as a plurality of entities coupled together with any one of a variety of infrastructures. For example, a network may comprise a plurality of "end nodes" on which applications run coupled to each other via one or more switches. Each switch may have multiple ports which can be used to connect to other switches and/or end nodes. Packets of data may be transferred through the network in accordance with a variety of protocols such as, and without limitation, source routing or destination routing via routing tables. Regardless of the protocol used to transfer data across the network, the topology of the network must be known. The term "topology" refers to the configuration of the network's entities, such as how the various ports on each switch and node are connected to ports on other switches and nodes.

It is possible for the network's topology to change. Such a change in topology may occur when a user connects additional equipment to the network, a port malfunctions, etc. In order to maintain the network operating in a sufficient manner, a mechanism typically is included in the network to detect a change in topology and determine the new topology. In accordance with one such mechanism, periodic "sweeps" are made during which each entity in the network is requested to provide topology information. Such information may be collected at a central point and from such information, a determination can be made as to whether a change in topology has occurred. Such a mechanism suffers from several disadvantages. For instance, because the aforementioned mechanism typically occurs at predetermined periods of time, topology changes will not be detected until the next scheduled sweep occurs. In the meantime, the network's management infrastructure may be unaware that a change in topology has occurred and, as a result, data packets may be mis-routed, lost, and/or cause undesirable network behavior (e.g., a system crash). The disclosed subject matter addressed one or more of the above issues.

SUMMARY

The problems noted above are solved in large part by a method and associated apparatus for spontaneous topology discovery in a computer network. The network may include a plurality of entities and the spontaneous topology discovery method may comprise detecting a change in the topology, creating a spanning tree, and propagating topology information pertaining to individual entities through the spanning tree towards an entity that functions as a "root." The spanning tree may comprise at least some of the network entities and an entity that functions as a root. The root may couple to at least one tier of entities having at least one entity.

In accordance with another embodiment, a computer system may comprise a plurality of end nodes and a plurality of switches coupled together and to the end nodes to form a topology. Further, a switch or end node may detect a change in the topology and, in response, initiate the generating of a tree in which one of the end nodes or switches becomes the root. As the root, the switch or node may receive topology information from all other end nodes and switches in the tree.

BRIEF DESCRIPTION OF THE DRAWINGS

For a detailed description of the preferred embodiments of the invention, reference will now be made to the accompanying drawings in which:

FIG. 5 provides more detail regarding the process of FIG. 4; and

FIG. 6 also provides more detail regarding the process of FIG. 4.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The term "spontaneous discovery process" refers to a process of determining the topology or other configuration of a network without waiting for a periodic sweep through the network polling the network entities for changes in topology. That is, a change in topology initiates the onset of the discovery process.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
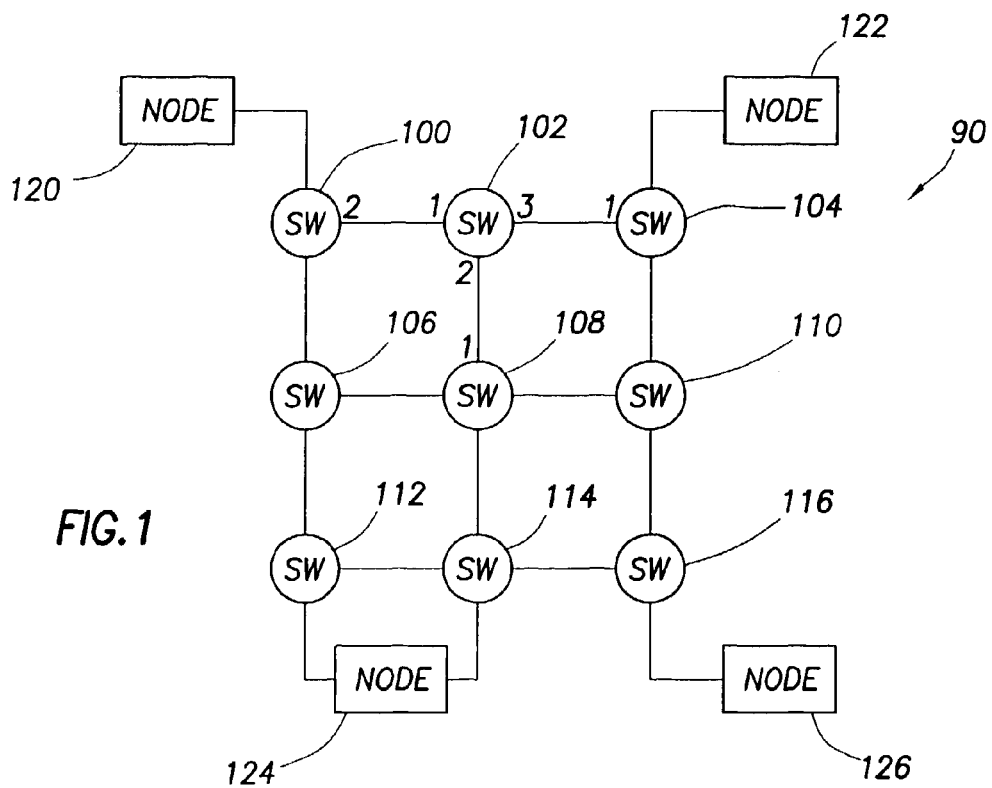
FIG. 1 shows an exemplary network in accordance with embodiments of the invention.

Referring now to FIG. 1, an electronic system 90 is shown in accordance with various embodiments of the invention. Electronic system 90 may comprise one or more switches 100-116 and one or more end nodes 120-126. Without limitation, electronic system 90 may comprise a computer system. The components shown in FIG. 1 may be arranged in a variety of configurations. In no way limiting the scope of this disclosure, the configuration shown in FIG. 1 includes switch 100 coupled to switches 102 and 106. Switch 102 coupled to switches 100, 104, and 108. Similarly, switch 104 couples to switches 102 and 110, switch 106 couples to switches 100, 108, and 112, switch 108 couples to switches 102, 106, 110, and 114, and switch 110 couples to switches 104, 108, and 116. Further, switch 112 couples to switches 106 and 114, switch 114 couples to switches 108, 112, and 116, and switch 116 couples to switches 110 and 114. Additional or different connections can also be made between the plurality of switches 100-116. Node 120 couples to the system via switch 100, while nodes 122 and 126 couple to switches 104 and 116 respectively. Node 124 is shown coupled to two switches 112 and 114. In general, an end node may couple to the system via one or more switches.

Via the plurality of inter-coupled switches, an end node 120-126 may communicate with another end node or a switch in the system. For example, node 120 may transmit data to any of the other nodes 122-126 or management information to one of the switches 100-116 possibly by going through one or more switches. One exemplary route for data to take between nodes 120 and 126 may comprise node 120, switch 100, switch 102, switch 108, switch 110, switch 116, and node 126. As should be apparent, in some cases more than one path may be available for a particular data or management packet to traverse the network between its source and destination. In general, any one of a variety of techniques may be implemented to permit the system to determine a suitable route for a packet to take through the plurality of switches. One such suitable techniques includes "source routing" in which the packet includes a series of output port numbers associated with the various switches through which the packet is intended to be routed. Another routing technique is destination routing in which the packet only includes a destination identifier but each switch on the path looks up a routing table in order to determine the output port through which to forward the packet.

Figure 2:
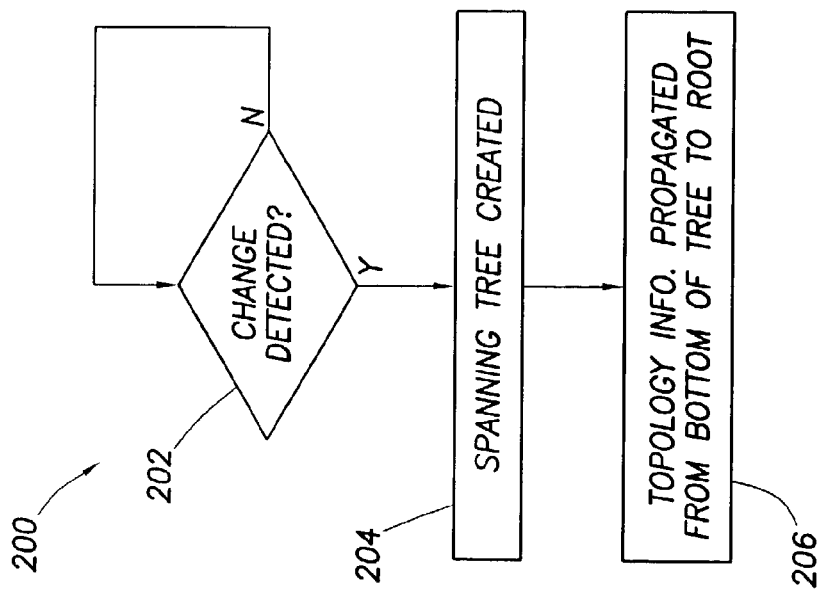
FIG. 2 shows an exemplary topology discovery process in accordance with embodiments of the invention.

In accordance with various embodiments of the present invention, spontaneous topology discovery is employed to facilitate a rapid detection and response to a change in network topology. Such topology changes may include, without limitation, a malfunction associated with a link between switches and/or between a switch and an end node. Further, a switch or a node may malfunction altogether bringing down multiple ports/links. An exemplary embodiment of a spontaneous topology discovery process is shown in FIG. 2 as process 200 and described below.

As shown, process 200 may comprise decision block 202 and blocks 204 and 206. In decision block 202, it is determined whether a change in the network topology has been detected. If so, control passes to block 204 in which a "spanning" tree is created, as will be described in more detail below with respect to FIG. 3. Once the spanning tree is created, new topology information is propagated from the bottom of the tree to the top, or "root" of the tree (block 206). Thus, the process 200 may be triggered by a detected change in topology and, as such, may occur spontaneously.

Figure 3:
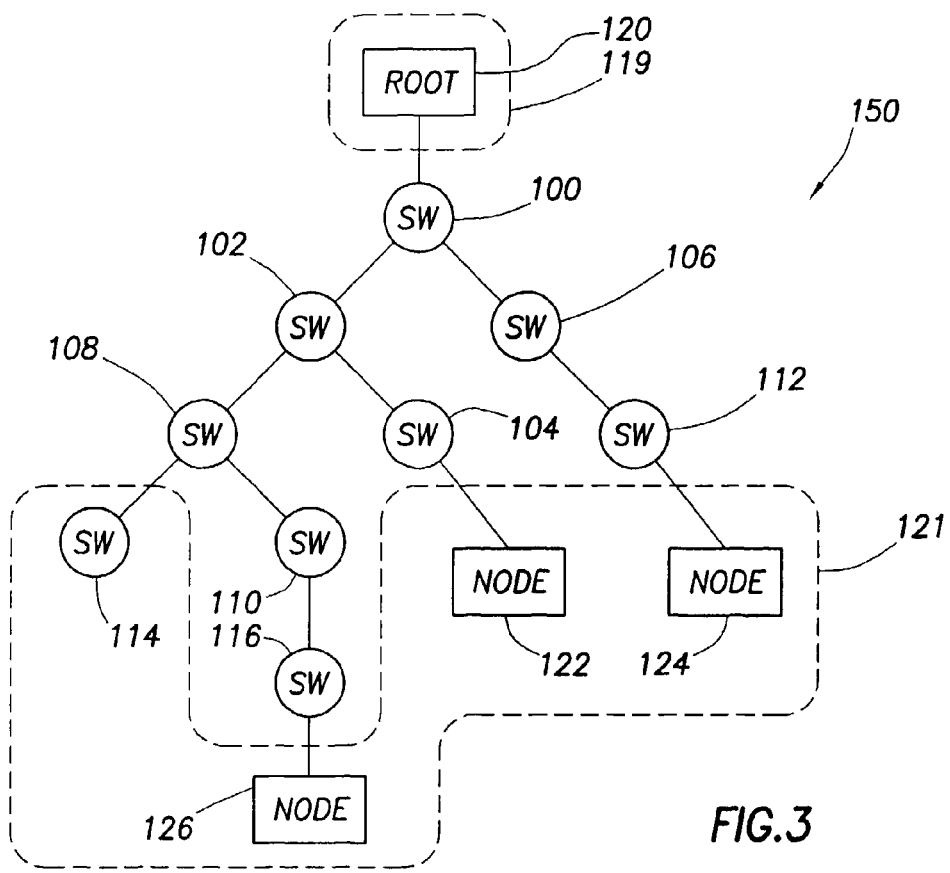
FIG. 3 shows an exemplary "spanning line" created according to the process of FIG. 2.

Referring now to FIG. 3, an exemplary embodiment of a spanning tree 150 is shown. The components shown in the spanning tree 150 of FIG. 3 represent the switches and nodes from FIG. 1 reorganized in accordance with an embodiment of the invention to permit spontaneous topology discovery. The root of the tree may comprise node 120 and is located at the "top" 119 of the tree 150. Each entity (e.g., switch or a node) may be a "parent" and/or a "child." For example, root 120 is a parent to one child, which is shown as switch 100. Switch 100 represents the child of parent 120 (the root) and also functions as a parent for children switches 102 and 106. Switch 106 represents the child of parent switch 100 and the parent of child switch 112. Switch 112, in turn, is the parent of child node 124. Similarly, switch 102 is the child of switch 100 and the parent to switches 108 and 104 which themselves are parents to switches 114, 110, and node 122, as shown. Further still, switch 110 is the parent to switch 116, which also is the parent of node 126. Entities 114, 126, 122 and 124 may be located at the "bottom" 121 of the tree 150. Other configurations for a spanning tree 150 based on the exemplary configuration of electronic system 90 in FIG. 1 are also possible besides that shown in FIG. 3.

Figure 4:
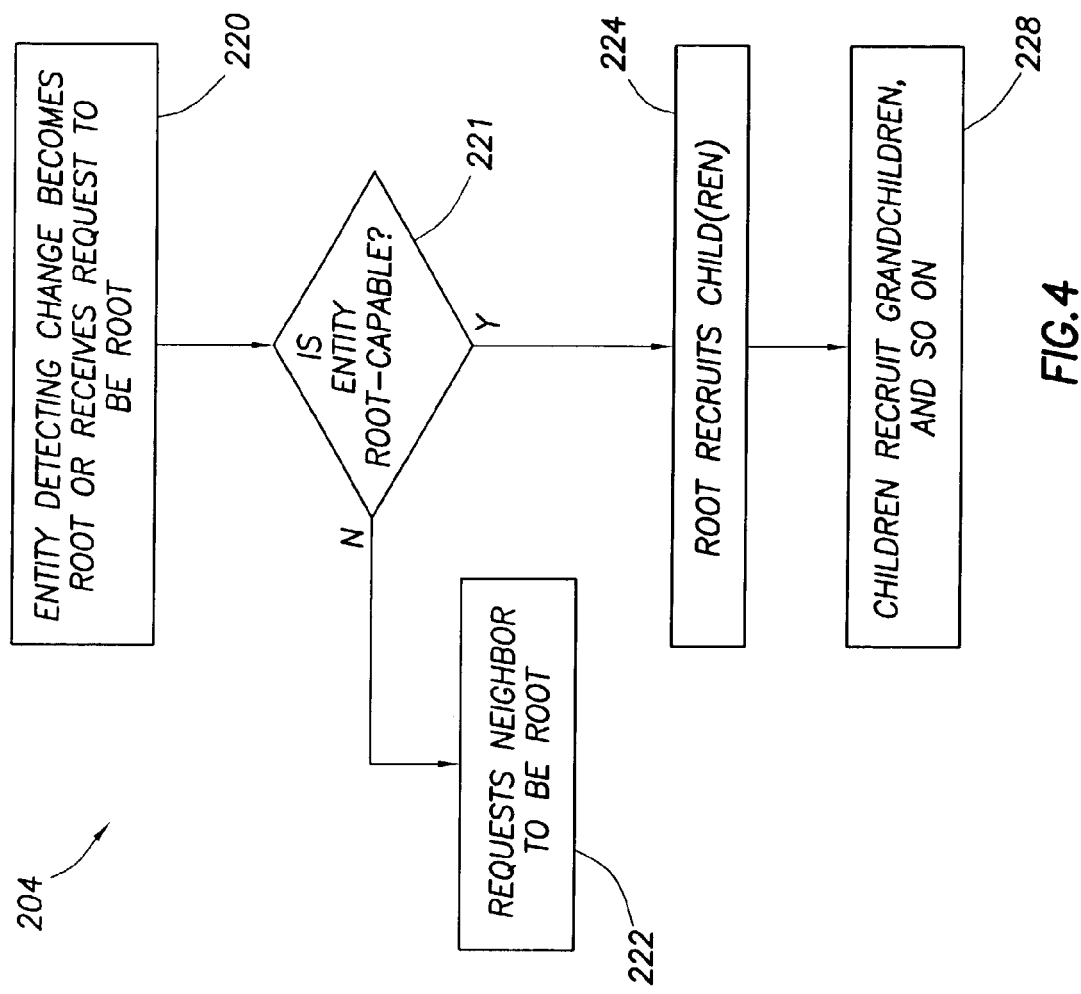
FIG. 4 provides more detail for the exemplary process of FIG. 2 in accordance with embodiments of the invention.

As explained above, block 204 in process 200 of FIG. 2 comprises creating a spanning tree, such as the exemplary spanning tree 150 of FIG. 3. Referring now to FIG. 4, an exemplary process for implementing the spanning tree created in block 204 is shown. In block 220, an entity, which may comprise a switch or a node, may either detect a change in the topology or receive a request from another neighboring entity to be the root of the spanning tree. As referred herein, the term "entity" refers to any component of the system 90 which may be part of the spanning tree 150, such as a switch or an end node. Further, the term "neighboring entity" or "neighbor" refers to an entity that has a direct communication link to an entity.

Referring briefly to FIG. 1 and by way of example, the neighbors of switch 108 include switches 102, 106, 110 and 114. An entity may detect a change in the topology, for example, by detecting that one of that entity's ports have malfunctioned or by detecting that the entity no longer has a functional communication link to its neighbor. Regardless of whether the entity detects the topology change itself, or another entity in the system detected the topology change and submitted a request to the entity to become the root, control passes to block 221. In block 221, the entity, which either detected the topology change or received the request to be root, determines whether it is capable of functioning as the root of the spanning tree. Determining whether the entity is root-capable may vary from application to application. In general, and without limitation, an entity may function as a root if it has sufficient resources, such as sufficient processing power and a sufficient amount of memory, to perform the actions described herein. If the entity determines that it is not root-capable, control passes to block 222 in which the entity may request that one of its neighbors become the root of the newly forming spanning tree. On the other hand, if the entity determines that it is root-capable, control passes to block 224 in which the entity (now termed the "root") may begin to recruit children for itself.

A root's child(ren) may comprise any one or more of the entities that are neighbors to the root. For example, in the spanning tree 150 of FIG. 3, root 120 was able to recruit one switch (switch 100) as its child. This was necessarily the case with respect to the exemplary embodiment of FIG. 3 because, referring to FIG. 1, node 120 only had one neighboring entity (switch 100) in the system 90. Once the root has recruited its children, control passes to block 228 in FIG. 4 in which the children begin to recruit grandchildren. That is, each child of the root attempts to become a parent for one or more other children entities in the system. Referring again to FIG. 3, root 120 recruited switch 100 as its child and switch 100 then recruited switches 102 and 106 as its children. The child recruitment process of block 228 (FIG. 4) may repeat itself until the spanning tree is fully formed. At that point, each entity in the network is aware of its parent, to the extent that it is not a root (which has no parent) and its child(ren), to the extent that it has a child. Each entity in the network, however, may not be aware of the full configuration for the spanning tree. Such knowledge is not necessary in the spontaneous topology discovery process described herein. Because each entity need not be aware of the complete network topology, each entity in the network need not have a large amount of memory for storage of such information. As such, the spontaneous topology discovery process described herein can be implemented with relatively little memory in each entity in the network.

Referring now to FIG. 5, an exemplary embodiment of block 224 from FIG. 4 is shown. In block 224, as described above, the root may recruit children for itself. Referring to FIG. 5, process 224 may comprise blocks 230, 232, and 234. In block 230, the root updates its "view identifier" (VID). In accordance with some embodiments, the VID may comprise, without limitation, a view number and a global unique identifier (GUID). Each entity in the network may include a GUID to uniquely differentiate that entity from all other entities. The GUID referred to in block 230 represents the unique identifier of an entity in the network that has assigned the associated view number. The view number may comprise an arbitrary number that is incremented each time a change in network topology is detected. The VIDs may be included in a variety of packet types, but preferably are included in at least management packets (e.g., packets used to configure one or more entities in the network and to perform other management functions). Each entity in the network may retain a VID in memory in that entity. When an entity receives a management packet, the entity may compare the VID contained in the incoming packet to the VID previously stored in the entity. By comparing the two VIDs, the entity may determine whether another entity in the network has detected a change in network topology. That is, when an entity directly detects a change in network topology, the entity generates a management packet containing a VID that includes that entity's GUID and a VID number that is greater than the entity's previously used VID. In accordance with some embodiments, the entity may simply increment the previously used VID. If the previous VID contains a view number of "750," the entity detecting a topology change may increment the previous view number to 751 and include view number 751 in the next management packet.

Referring briefly to FIG. 4, in block 220 an entity may receive a request from a neighboring entity to become the root for the newly forming spanning tree. Also in block 224, the entity that has been selected as the root begins to recruit children for itself. Both actions may include the receipt of a management packet (block 220) or the transmission of a management packet (block 224) that comprises an updated VID. That is, an entity may receive a request from another entity to be a root in block 220. The entity receiving the incoming request may compare the VID embedded in the request to the current view retained by the entity. If the entity detects that the view has been updated, the entity determines that a topology change has occurred as detected by another entity in the network, and that the entity receiving the new VID is requested to become the new root.

Referring again to FIG. 5, the root may begin to recruit its children by updating its VID in block 230 to include a new view number and the GUID associated with the root. In block 232, via a management packet, the root may pass its newly updated VID to its neighbor. The management packet may request the neighbor to become a child of the root. In block 234, the neighbor may decide whether to accept the root as its parent. That decision may be based on one or more criteria. For example, the neighbor may have already been recruited as a child of another entity in the network, and, as such, may refuse to become the child of the root.

Referring to FIG. 6, an exemplary implementation of block 228 from FIG. 4 is shown comprising blocks 240 and 242. In block 240, each entity may pass the root's VID to its neighbors (i.e., the neighbors of the entity referenced in block 240) that are still available to be recruited as children. In block 242, each potential child decides whether to accept the entity as its parent. This decision may be based on whether the potential child has already been recruited as a child in another portion of the presently forming spanning tree.

At this point, a spanning tree 150 has been created in furtherance of block 204 in FIG. 2. As explained previously, once the spanning tree is created, topology information may propagate from the bottom of the spanning tree to the root. An exemplary embodiment of this process is described below. Once the topology information is collected by the root, the root then knows the new topology of the network and may disseminate that information in accordance with the implementation of the network.

A variety of techniques may be employed to propagate topology information up through the spanning tree 150 to the root node 120. One suitable technique is as follows. Each entity in the system 100 is aware of its immediate neighbors, including its neighbor's identity and the port numbers through which the entity communicates with each neighbor. For example, referring briefly to FIG. 1, switch 102 is aware that it is coupled to switches 100, 104, and 108. As shown, port 1 on switch 102 couples to port 2 on switch 100, while ports 2 and 3 on switch 102 couple to port 1 on both switches 104 and 108. As such, switch 102 is aware that it has three neighbors and the port numbers used to interconnect switch 102 to the three neighbors. In accordance with an embodiment of the invention, each switch sends one or more messages up through its parent node in the spanning tree 150 toward the root node indicating the local topology surrounding that particular switch. To reduce network traffic, each such message must be acknowledged as being received by the parent before the entity can begin to propagate its next topology update message up toward the root. As such, a series of topology packets and associated acknowledgments occur by which the entities propagate their topology information up to the root.

The processes disclosed herein generally describe a topology discovery process that occurs spontaneously, that is, a process that is triggered upon detection of a change in topology. Further, the network can continue to be used to route normal data traffic while the discovery process is on-going. It should also be noted that topology changes are not the only events that can trigger the discovery process to occur. For example, changes in a service that runs on a particular node may cause a new round of discovery to occur. Such service changes may include the addition of a new service on to a node or switch, or the deletion or other alteration of a service from an entity. Further still, a user may add new equipment altogether to the network in the form of one or more switches and/or end nodes.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:
1. A method, comprising:
  (a) a network hardware entity spontaneously detecting within itself a malfunction that affects a network topology;
  (b) in response to detecting said malfunction, the network hardware entity initiates creation of a spanning tree by becoming a root for the spanning tree or, if the network hardware entity determines that it has insufficient pro- cessing resources and memory resources to be the root, by requesting that a neighboring network hardware entity become the root;

(c) creating the spanning tree by the root recruiting neighboring network hardware entities as children of the root and said children recruiting neighboring network hardware entities as grandchildren of the root and so on, wherein each recruited network hardware entity transmits topology messages back to the root such that the root collects topology information for the entire spanning tree.

2. The method of claim 1 wherein (c) includes each recruited network hardware entity storing a view identifier (VID) and, upon detecting a topology change, a recruited network hardware entity increments its VID and includes the incremented VID in subsequent management packets.

3. The method of claim 2 wherein the root recruits at least one other network hardware entity to be a child to the root by invitation and wherein each recruited network hardware entity decides whether to accept the invitation.

4. The method of claim 1 wherein (c) includes transmitting topology messages back to the root only after the entire spanning tree is formed and then transmitting topology messages starting at a bottom of the spanning tree back to the root.

5. The method of claim 4 further comprising each network hardware entity that propagates a topology message waiting to receive an acknowledgement from a parent network hardware entity before propagating any subsequent topology messages, each topology message containing a local topology of an individual network hardware entity.

6. The method of claim 1 wherein (b) includes determining whether said neighboring network hardware entity has sufficient processing resources and memory resources to be the root and, if not, requesting that a next neighboring network hardware entity be the root and so on.

7. A computer system, comprising:
a plurality of end nodes;
a plurality of switches coupled together and to said end nodes to form a topology; and
wherein a switch or end node detects a change in said topology and, in response, initiates generating a spanning tree in which one of said end nodes or switches becomes a root and, as such, receives topology information from all other end nodes and switches in said spanning tree,
wherein the spanning tree is generated by switches or end nodes passing the root's view identifier (VID) to neighbors, the VID having a view number that is incremented for each topology change and a global unique identifier (GUID), and
wherein topology messages are not transmitted back to the root until the spanning tree is completely formed and wherein topology messages are first transmitted from a bottom of the spanning tree back towards the root.

8. The computer system of claim 7 wherein the switch or end node that detects the change becomes the root.

9. The computer system of claim 7 wherein the switch or end node that detects the change may request another switch or end node to become the root.

10. The computer system of claim 7 wherein the root recruits a switch or end node to be a first child to the root and through which topology messages pass to be delivered to the root.

11. The computer system of claim 10 wherein the first child recruits another switch or end node as a second child, said first child being a parent to the second child.

12. The computer system of claim 11 wherein the second child determines its direct connections to neighboring switches or end nodes and transmits a message to the parent, including information describing the direct connections of the second child.

13. A computer system, comprising:
a plurality of end nodes;
a plurality of switches coupled together and to said end nodes to form a topology; and
a means for detecting a change in said topology,
in response to detecting a change in said topology, said means initiates generating a spanning tree in which one of said end nodes or switches becomes a root and, as such, receives topology information from all other end nodes and switches in said spanning tree,
wherein topology messages are not transmitted back to the root until the spanning tree is completely formed and wherein topology messages are first transmitted from a bottom of the spanning tree back towards the root.

* * * * *